US005818642A

United States Patent [19]

[11] Patent Number: 5,818,642

[45] **Date of Patent: *Oct. 6, 1998**

Collette

[54] MESSAGE-REFLECTING APPARATUS AND METHOD OF USE

[76] Inventor: Anthony W. Collette, 2116 N. Indiana Ave., Oklahoma City, Okla. 73106

[ * ] Notice: This patent issued on a continued prosecution application filed under 37 CFR 1.53(d), and is subject to the twenty year patent term provisions of 35 U.S.C. 154(a)(2).

[21] Appl. No.: 654,568

[22] Filed: May 29, 1996

[51] Int. Cl.[6] .................... G02B 27/14

[52] U.S. Cl. .................... 359/630; 359/631

[58] Field of Search .................... 359/630, 631

[56] References Cited

U.S. PATENT DOCUMENTS 3,276,813 10/1966 Shaw .................... 359/630

4,715,642 12/1987 Dobbs .................... 359/629

5,128,659 7/1992 Roberts et al. .................... 340/705

*Primary Examiner*—David C. Nelms

*Assistant Examiner*—Evelyn A. Lester

*Attorney, Agent, or Firm*—McAfee & Taft

[57] ABSTRACT

Apparatus for reflecting a message in a reflective surface and method of use. The apparatus comprises a substrate having message indicia thereon in reverse, mirror-image format. When the substrate is positioned on a surface adjacent to the reflective surface, the message will be reflected as a directly viewable image because of the mirror-image format, and the message will appear to "float" in the reflective surface because of the reverse format wherein the message is a light color on a darker background. In the preferred embodiment, the reflective surface is a vehicle windshield, and the substrate is positioned on a dash surface adjacent to the windshield such that the image may be viewed by a driver and/or passengers in the vehicle. A method of use of the apparatus is also disclosed.

7 Claims, 1 Drawing Sheet

MESSAGE-REFLECTING APPARATUS AND METHOD OF USE

BACKGROUND OF THE INVENTION

1. Field of the Invention

The present invention relates to apparatus and method for displaying an image or message, and more particularly, to an apparatus and method for reflecting a message in a reflective surface, such as a vehicle windshield.

2. Description of the Prior Art

There are numerous self-help and motivational materials available in today's marketplace. Some of these are religious in nature, others relate to "New Age" philosophies, and still others are directed simply to self-improvement. Among items used in these areas are motivational phrases and/or images which may be provided in books, tapes, posters, collections of quotations, calendars, computer software and other items.

An ideal way to contribute to self-motivation and self-help is to utilize time which is otherwise wasted. A major source of lost time for people is the time taken to drive to and from work or other locations. Self-help audio tapes have been developed for this purpose, as well as for use at other times besides driving. However, the use of lengthy printed materials is obviously substantially impractical for a driver.

There is a need to provide motivational messages during driving time in addition to those provided on audio tapes. The present invention provides a solution to this problem by an apparatus and method for projecting or reflecting a brief motivational message in a lower portion of a vehicle windshield. In this way, the driver may briefly glance at the image without being distracted from his or her driving duties. This is accomplished by providing a substrate positionable adjacent to the vehicle windshield, wherein the substrate has reverse, mirror-image message indicia incorporated thereon.

Of course, the use of mirror-image, i.e., backwards, messages is well known. For example, a mirror-image identification is frequently provided on the front of emergency vehicles, such as ambulances. In this way, the word "Ambulance" is readable in a rear-view mirror of a vehicle in front of the ambulance.

Reverse printing, i.e., the printing of a light image on a dark background, is also known, but the present invention combines a reverse and mirror-image message in a unique way.

SUMMARY OF THE INVENTION

The present invention provides an apparatus and method of reflecting an image or message in a reflective surface, such as a vehicle windshield. The invention may be characterized as an apparatus comprising a substrate and message indicia incorporated on the substrate. The message indicia comprises the message, which is desired to be reflected, in a reverse, mirror-image form such that the message may be directly viewed in the reflective surface when the substrate is positioned adjacent to the reflective surface. Specifically, but not by way of limitation, the substrate is adapted for positioning on a dash surface adjacent to a windshield of a vehicle. The windshield characterizes the reflective surface.

The reverse aspect of the message indicia means that it preferably comprises a light-colored image on a darker background. In this way, the lighter color of the message itself results in the message appearing to "float" in the windshield while the darker background is substantially invisible. Since most vehicle dashboards are of a dark color so that they will not reflect in the windshield, the dark background on the substrate will tend to blend in and not be easily visible when reflected in the windshield.

Preferably, the apparatus further comprises a substantially clear plastic coating on the substrate.

Stated in another way, the present invention may be characterized as a message-reflecting system comprising a vehicle windshield, a dash surface adjacent to the windshield and a substrate comprising message indicia incorporated thereon. The message indicia comprises a reverse, mirror-image format, and the substrate is positionable on the dash surface such that the message indicia is viewable as a "floating" image reflected in the windshield.

The method of reflecting an image in a reflective surface of the present invention comprises the steps of providing message indicia on a substrate in a mirror-image and reverse format, positioning the substrate on a surface adjacent to the reflective surface such that the message indicia is viewable as a reflected image in the reflective surface, and viewing the reflected image in the reflective surface. In the preferred embodiment, the reflective surface is a vehicle windshield, and the surface adjacent to the reflective surface is an upper dash surface of the vehicle.

Numerous objects and advantages of the invention will become apparent as the following detailed description of the preferred embodiment is read in conjunction with the drawings which illustrate such embodiment.

DESCRIPTION OF THE PREFERRED EMBODIMENT

Figure 1:
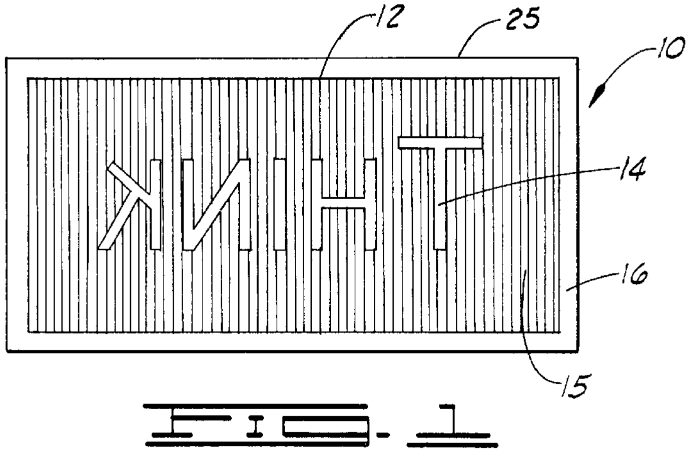
FIG. 1 shows a front view of the apparatus of the present invention for reflecting a message or image in a reflective surface.

Referring now to the drawings, and more particularly to FIG. 1, the apparatus of the present invention for reflecting an image or message in a reflective surface is shown and generally designated by the numeral 10. Preferably, apparatus 10 comprises a substrate 12 having message indicia 14 incorporated thereon. Substrate 12 may be in the form of a placard, but the invention is not intended to be so limited. The present invention is intended to include message indicia which comprise messages such as for self-help or of a motivational nature. For example, in the illustrated embodiment, message indicia 14 includes the word "Think," but this is for illustrative purposes only. For purposes of illustration herein, background 15 is shown with vertical shading lines, but it should be understood that background 15 is intended to be a solid color which is darker than the color of message indicia 14. Any message or image would be applicable.

Message indicia 14 is incorporated on substrate 12 in a reverse, mirror-image format. That is, the message is reversed, using a light color on a darker background 15. Message indicia 14 is also a mirror image so that the message included therein may be read as a reflected message in a reflective surface.

Figure 2:
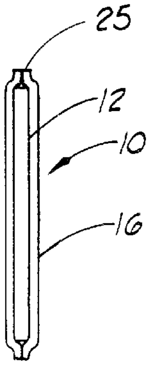
FIG. 2 is an end view of the apparatus of FIG. 1.

In a preferred embodiment, substrate 12 is laminated within a substantially clear plastic outer coating 16, but apparatus 10 may be used without such a coating. Coating 16 is best seen in FIG. 2.

Figure 3:
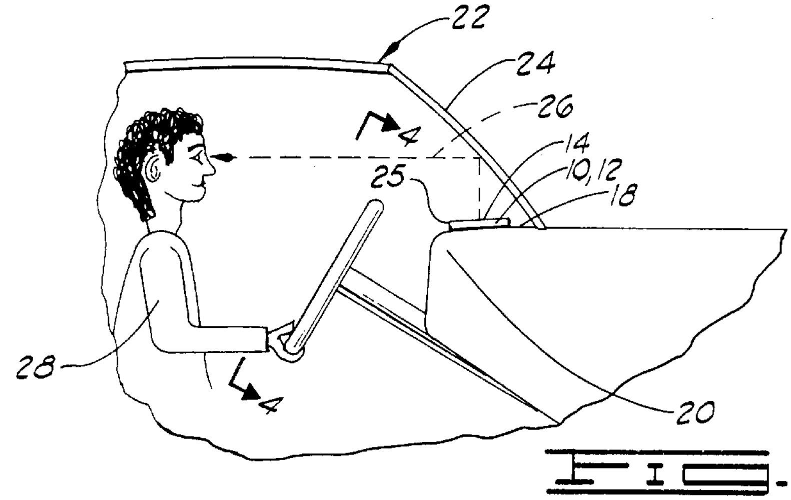
FIG. 3 shows the apparatus of the present invention in an operating position on a surface of a vehicle dashboard.
Figure 4:
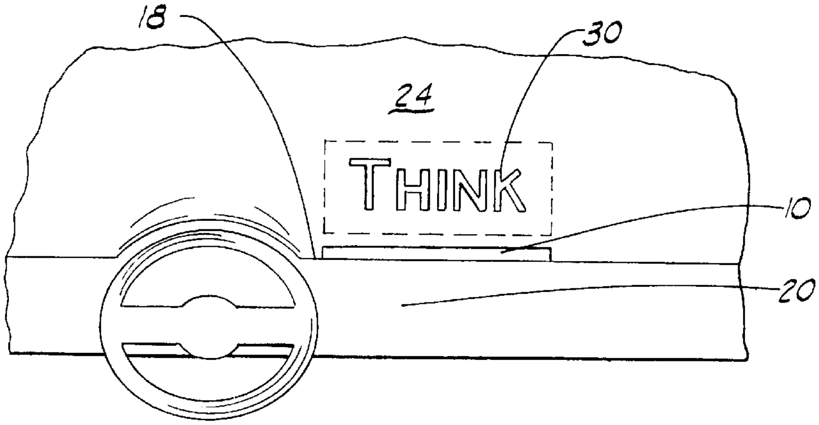
FIG. 4 is a view taken along lines 4—4 in FIG. 3.

Referring now to FIG. 3, apparatus 10 is shown in an operating position in which it is placed on a surface 18 of a dashboard 20 of a vehicle 22. Preferably, surface 18 is an upper dash surface 18 of vehicle 22 as shown, and apparatus 10 is positioned on the dash surface adjacent to a windshield 24 of vehicle 22. Top edge 25 of apparatus 10 is positioned toward driver 28.

Apparatus 10 is reflected in windshield 24, as indicated by dashed line 26, and thus may be viewed by driver 28. Passengers may also view the reflected apparatus. Because of the mirror-image format of message indicia 14, the message may be read directly as a reflected message indicia 30 in windshield 24 of vehicle 22. Also, because of the reverse format of message indicia 14 with a lighter image on darker background 15, reflected message indicia 30 appears to "float" in windshield 24 with background 15 being substantially invisible, or at least barely visible, because most vehicle dashboards are also dark. Depending upon lighting conditions and the colors of message indicia 14 and background 15, the intensity of the reflected image 30 of message indicia 14 may vary from substantially invisible, to faintly visible, to strong and clear, etc.

A specific application of apparatus 10 is to assist in self-improvement by keeping an uplifting, inspiring and motivational message in front of driver 28, thereby making good use of drive time which would otherwise be wasted. The messages are short so that driver 18 is not distracted from the action of driving itself. Messages of various types, including religious, "New Age" and general self-help and/or motivational messages may be used. However, additional uses of apparatus 10 are possible, such as spelling and/or definitions of new words, and the invention is not intended to be solely limited to self-help messages.

In addition to apparatus 10, the present invention also includes a method of reflecting a message and/or image in a reflective surface, such as a vehicle windshield. Such a method may comprise providing message and/or image indicia on a substrate in a mirror-image and reverse format, positioning the substrate on a surface of a dashboard of a vehicle such that the message and/or image is reflected in a windshield of the vehicle adjacent to the dash, and viewing the reflected message indicia in the windshield.

It will be seen, therefore, that the apparatus for reflecting a message in a reflective surface and method of use of the present invention are well adapted to carry out the ends and advantages mentioned, as well as those inherent therein. While presently preferred embodiments of the apparatus and method have been described for the purposes of this disclosure, numerous changes in the arrangement and construction of parts of the apparatus and the steps in the method are encompassed within the scope and spirit of the appended claims.

What is claimed is:

1. An apparatus for providing a reflected image of a message, said apparatus comprising:

a portable substrate which is selectively positionable adjacent to a reflective surface; and message indicia on said substrate, said message indicia being in a mirror-image form, said message indicia also being in a reverse form comprising an image on a background, said image being lighter than said background, such that when the indicia message is directly viewed in the reflective surface, said background substantially disappears visually and said image appears to float in the reflective surface.

2. The apparatus of claim 1 wherein said substrate is adapted for positioning on a dash surface adjacent to a windshield of a vehicle, and wherein said windshield characterizes said reflective surface.

3. The apparatus of claim 1 further comprising a substantially clear coating on said substrate.

4. A message-reflecting system comprising:

a vehicle windshield;

a dash surface adjacent to said windshield;

a portable substrate which is selectively postitionable on said dash surface by a user; and message indicia on said substrate and comprising an image in a mirror-image format on a background, said image being a selected one of a plurality of images, wherein said background is darker than said image such that when said message indicia is reflectively viewed in said windshield, said background substantially disappears visually and said image a appears to float in said windshield.

5. The system of claim 4 wherein said substrate has a substantially clear plastic coating thereon.

6. A method of displaying a message, said method comprising the steps of:

providing message indicia on a portable substrate in a mirror-image format, said message indicia having an image on a background darker than said image, said message indicia being a selected one of a plurality of message indicia;

selectively positioning said substrate on a support surface adjacent to a reflective surface such that said message indicia is reflectively viewable in said reflective surface wherein said background substantially disappears visually and said image appears to float in said reflective surface; and reflectively viewing said message indicia in said reflective surface.

7. The method of claim 6 wherein: said reflective surface is a vehicle windshield; and said support surface is an upper dash surface of a vehicle.

* * * * *